J. C. PORTER.
ROTARY MOTOR.
APPLICATION FILED NOV. 22, 1911.
1,046,490.
Patented Dec. 10, 1912.
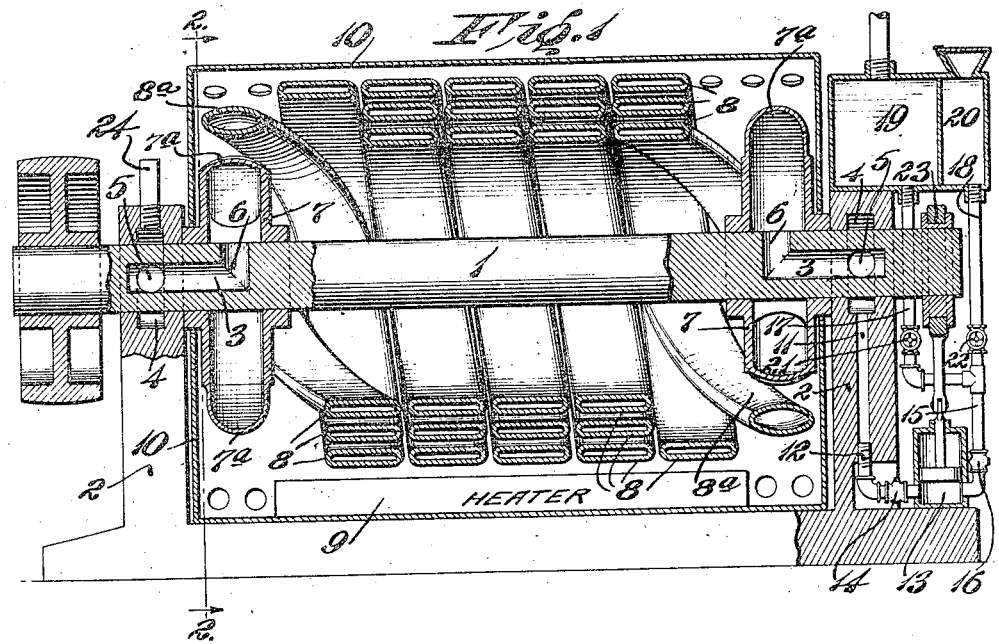
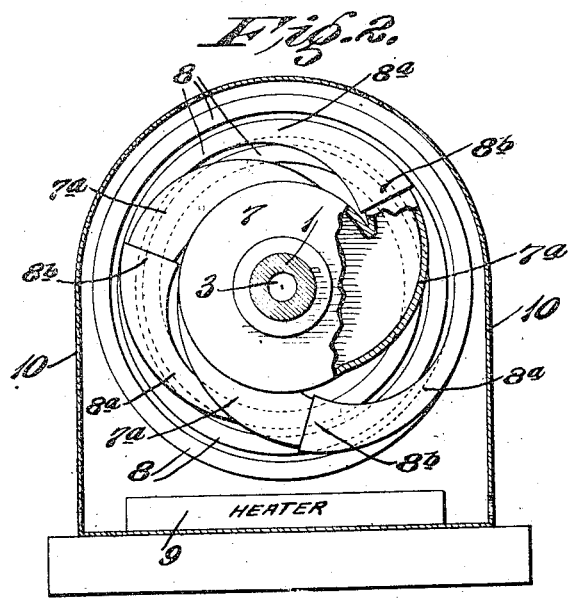
Witnesses:
Edgar T. Farmer
G. A. Pennington
Inventor.
John Cooper Porter,
By Cassett Co
his Attys.

UNITED STATES PATENT OFFICE.

JOHN COOPER PORTER, OF ST. LOUIS, MISSOURI.

ROTARY MOTOR.

1,046,490.  Specification of Letters Patent.  Patented Dec. 10, 1912.

Application filed November 22, 1911. Serial No. 661,725.

*To all whom it may concern:*

Be it known that I, JOHN COOPER PORTER, a citizen of the United States, and a resident of the city of St. Louis and State of Missouri, have invented a new and useful Improvement in Rotary Motors, of which the following is a specification.

This invention relates to motors and more particularly to rotary motors or engines or those whose power elements revolve about an axis.

The invention has for its principal objects to concentrate and utilize the friction of steam or other fluid or motive agent under pressure in developing power; to eliminate reaction; to provide for the generation of the motive pressure within the motor itself; and to attain certain advantages as will hereinafter more fully appear.

It is known that the passage of any fluid, liquid or gas under pressure through a pipe, tube or passageway is impeded by friction. This friction is generated and exists materially and effectively only in close proximity to the wall or walls of the passageway. For example, in a passageway whose walls are a considerable distance apart, there is a central body of the fluid or other agent which is out of range of effective friction so that it passes freely without appreciable resistance.

The present invention, therefore, contemplates the concentration of friction by passing the fluid or other agent through a restricted or shallow but relatively wide passageway having a relatively large wall surface and movable in the direction of the flow or travel of such agent.

The invention consists in the parts and in the arrangements and combinations of parts hereinafter described and claimed. It is to be understood, however, that I do not limit myself to the specific structure shown, nor to any particular motive agent or fluid by the term "steam" which will hereinafter be generally used throughout the specification and claims.

In the accompanying drawing which forms part of this specification and wherein like symbols refer to like parts wherever they occur,—Figure 1 is a vertical longitudinal section through a motor embodying the invention; and Fig. 2 is a transverse section on the line 2—2 of Fig. 1.

The motor or concentrator illustrated in the drawing comprises a shaft 1 which is journaled in standards 2. The shaft is provided with axial chambers 3 near its opposite ends which communicate with annular chambers 4 in the standards 2 through openings 5. The axial chambers 3 communicate respectively through openings 6 with annular chambers or manifolds 7 fixed on the shaft. Pipes or tubes 8 are coiled in the form of a helix about the shaft 1. These tubes are connected at their opposite ends with the respective manifolds 7. The tubes are flattened so that the distance between their convolute walls is relatively small and the wall surface large. There may be any desirable number of the helixes or coils of tubes, ranging from one, to two, three or more, as desirable. As shown, there are three. The tubes are coiled as about a cylinder and at a considerable distance from the axis of the shaft so as to give momentum to the motor. They may be supported only at their ends which are connected to the respective manifolds 7, or, obviously, in some cases, they may be supported at intervals throughout their length upon the shaft through the medium of braces or spokes and suitably secured together to make the structure more rigid. The ends of the tubes are turned in a gradual curve, as at $8^a$, to the peripheries of the manifolds so as to avoid sharp bends and thereby eliminate reaction. The manifolds 7 are provided with curved substantially tangential nozzles $7^a$ which are of a relatively large diameter or of a diameter to give them an area equal to the area of the flared end portions $8^b$ of the tubes which are connected thereto.

Steam or other motive agent under pressure may be admitted from an outside generator or source as described in a copending application filed by me on a motor whose principle of operation is substantially the same as that herein set forth, but I prefer in this case to generate the steam or motive pressure within the motor itself. Therefore, a heater 9 is placed in proximity to the rotor and a housing 10 is provided to concentrate the heat about the rotor. Any desirable type of fuel burner, furnace or heater may be employed. Hence it is not shown in detail.

A passageway 11 leads to the annular chamber 4 in one of the standards 2. This passageway is connected by a pipe 12 to a pump cylinder 13. The pipe 12 has a check valve 14 which obviously opens in the direction of the passageway 11. A pipe 15 is also connected to the pump cylinder and has a check-valve 16 which opens toward the latter. This pipe 15 has two branches 17 and 18 which connect respectively with reservoirs 19 and 20. The branches 17 and 18 have, respectively, cut-off valves 21 and 22, so that either one or both of the tanks or reservoirs 19 and 20 may be opened to communication with the pump, as desirable. One of the tanks may be used for water and the other for any other liquid to be used in connection with the water in the motor, or it may be used for gasolene or other hydrocarbon supply in case the motor is used as a hydrocarbon or internal combustion engine. In the latter case any obvious igniting or exploding device may be provided. Hence, the same is not shown in the drawing.

In the operation of the motor as a steam engine, for which it is primarily designed, water is injected into the chambers and coils of the rotor by the pump 13 which is operated from an eccentric 23 on the end of the shaft 1. The coils being heated by the heater or furnace 9, the water is converted into steam as it enters the first convolutions of the coils. The steam acts with great friction upon the walls of the successive convolutions, and thereby causes the rotor to turn on its axis. The heater maintains the steam under high pressure throughout the entire length of the coils and its force is only exhausted as it passes into the annular chamber or manifold at the end. Thus the full force and benefit of the friction is utilized and there is no reaction to retard the motor as the steam is discharged with its force expended. The motor may also be operated by steam supplied under pressure from an outside source; and the heater may or may not be used in such a case, as desired. So, too, in some cases, the exhaust pipe 24 may be connected with a condenser and the water of condensation may be returned to the tank 19 to be used over again.

Preferably, the channels or openings of the tubes 8 are large where starting from the steam chambers or manifolds and not restricted until near the circumferential portion of the rotor where the power is to be applied. The efficiency of the motor depends materially upon the relatively wide but shallow passageways starting from the axis of the rotor and terminating at the axis so as to eliminate reaction. The coils may be made in any desirable length and of any desirable number depending upon the desired power to be obtained. In some cases it may be desirable to gradually decrease the width of the pasageways toward the discharge end of the rotor so that the steam will be effective throughout the entire time it is passing through the passageways even though it is gradually spending its force.

What I claim is:

1. A motor comprising a revolving power element having an elongated relatively shallow but wide passageway extending around the axis thereof, means for supplying a fluid to said passageway at one end, means for exhausting the fluid at the opposite end thereof, and means coöperating with said power element for generating pressure of the fluid in said passageway.

2. A motor arranged and adapted for operation by the friction of a fluid under pressure, comprising a rotor having a helical relatively shallow but wide passageway, means for supplying the fluid to said passageway, and a furnace in juxtaposition to said rotor for generating the pressure of the fluid in said passageway.

3. A motor arranged and adapted for operation by the friction of steam, comprising a rotor having about its axis a helical relatively shallow but wide passageway, means for injecting water into said passageway at one end, means for exhausting the pressure at the opposite end of said passageway, and means for heating the rotor to transform the contained water into steam.

4. A rotor comprising a revolving shaft having two axial chambers, two annular manifolds on said shaft communicating respectively with said axial chambers, a helical tube extending around said shaft and communicating at its opposite ends with the respective manifolds, the portion of said tube intermediate its ends being flattened so as to have a relatively shallow but wide opening, and the end portions of said tube being enlarged, means for supplying fluid under pressure to one of said shaft chambers, and means for exhausting the pressure from the opposite shaft chamber.

5. A motor comprising a revolving shaft, a rotor on said shaft having a helical relatively shallow but wide passageway, means for heating said rotor, and means for supplying motive fluid to said passageway comprising a pump operatively connected to said shaft.

6. A revolving steam motor operated by the friction of steam, said motor comprising a rotor having about its axis an elongated helical relatively shallow but wide passageway, said passageway being arranged for the injection of water at or near one end of the axis thereof and for the discharge of steam at or near the other end of its axis, the short dimension of said passageway being equal to the effective range of friction, and means for heating the motor to generate and maintain the steam pressure therein.

7. A motor comprising a rotor having a relatively shallow but wide passageway extending helically about its axis, the short dimension of said passageway being equal to the effective range of friction of the motive agent under pressure, the wide dimension of the passageway extending in the direction of the axis of the rotor, said passageway beginning and terminating at the axis, and means for supplying the motive agent under pressure to one end of the passageway and exhausting it from the opposite end.

8. A motor operated by the friction of a motive agent comprising a revolving power element having a plurality of helical passageways disposed about its axis, said passageways beginning at or near the axis of the power element at one end and terminating likewise at the opposite end, and means for supplying a motive agent under pressure to said passageways at one end and exhausting it from the opposite end, said passageways being relatively shallow but wide, the short dimension of the respective passageways being equal to the effective range of friction.

9. A motor operated by the friction of a motive agent comprising a revolving power element consisting of a shaft having axial chambers therein, annular manifolds on said shaft in communication with the respective axial chambers, one or more passageways extending helically about the shaft and communicating at their opposite ends with the respective manifolds, the distance between the convolute walls of said passageway or passageways being equal to the effective range of friction and the distance transversely being relatively large.

Signed at St. Louis, Missouri, this 18th day of November, 1911.

JOHN COOPER PORTER.

Witnesses:
G. A. PENNINGTON,
PAULINE AMBERG.